United States Patent
Pontai

(10) Patent No.: US 10,704,891 B2
(45) Date of Patent: Jul. 7, 2020

(54) METHOD AND APPARATUS FOR DETERMINING THE 3D COORDINATES OF AN OBJECT

(71) Applicant: CARL ZEISS INDUSTRIELLE MESSTECHNIK GMBH, Oberkochen (DE)

(72) Inventor: Béla Pontai, Munich (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 302 days.

(21) Appl. No.: 15/816,491

(22) Filed: Nov. 17, 2017

(65) Prior Publication Data
US 2018/0156601 A1    Jun. 7, 2018

(30) Foreign Application Priority Data
Dec. 2, 2016 (DE) .......................... 10 2016 014 384

(51) Int. Cl.
| | | |
|---|---|---|
| *G01B 11/00* | (2006.01) |
| *G01B 5/004* | (2006.01) |
| *G01B 11/25* | (2006.01) |
| *G01B 21/04* | (2006.01) |
| *G01S 17/48* | (2006.01) |
| *G01S 17/66* | (2006.01) |
| *G01S 5/16* | (2006.01) |

(52) U.S. Cl.
CPC ............ *G01B 11/002* (2013.01); *G01B 5/004* (2013.01); *G01B 11/2513* (2013.01); *G01B 11/2531* (2013.01); *G01B 21/045* (2013.01); *G01S 5/163* (2013.01); *G01S 17/48* (2013.01); *G01S 17/66* (2013.01)

(58) Field of Classification Search
CPC .............. G01B 11/2513; G01B 21/045; G01B 11/2531; G01B 11/002; G01B 5/004; G01S 17/66; G01S 17/48; G01S 5/163
USPC .......................................... 356/3.1
See application file for complete search history.

(56) References Cited

U.S. PATENT DOCUMENTS

| | | | |
|---|---|---|---|
| 7,319,515 B2 * | 1/2008 | Ohtomo ............... | G01C 15/004 250/236 |
| 2004/0032974 A1 * | 2/2004 | Kriesel .................. | A01K 29/00 382/110 |

FOREIGN PATENT DOCUMENTS

| | | |
|---|---|---|
| DE | 102009032262 A1 | 1/2011 |
| DE | 102011011360 A1 | 8/2012 |
| DE | 102014012203 A1 | 2/2015 |

* cited by examiner

*Primary Examiner* — Daniel L Murphy
(74) *Attorney, Agent, or Firm* — Harness, Dickey & Pierce, P.L.C.

(57) ABSTRACT

A 3D sensor for an apparatus for determining the 3D coordinates of an object comprises in accordance with the invention at least one camera and at least three plane projectors.

14 Claims, 6 Drawing Sheets

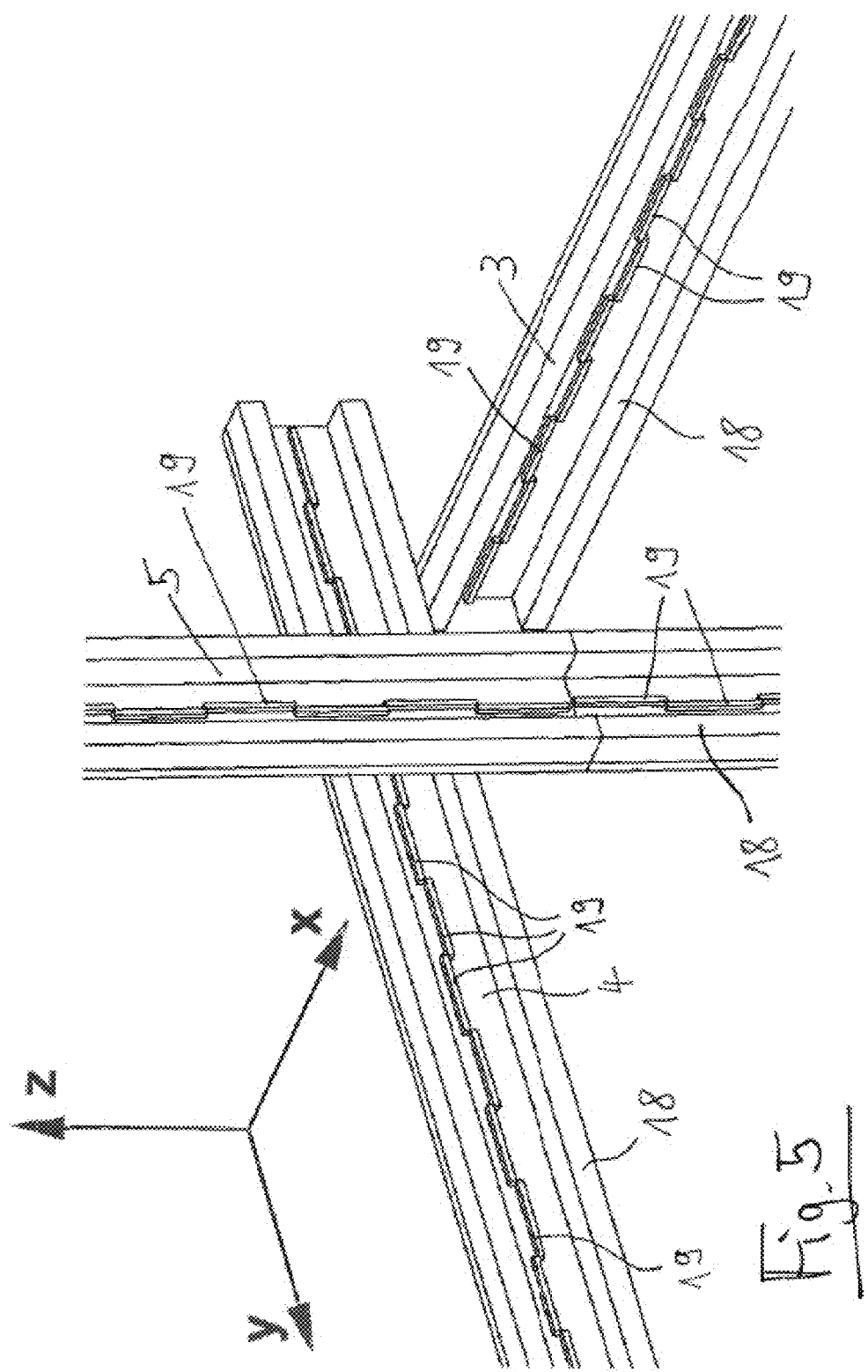

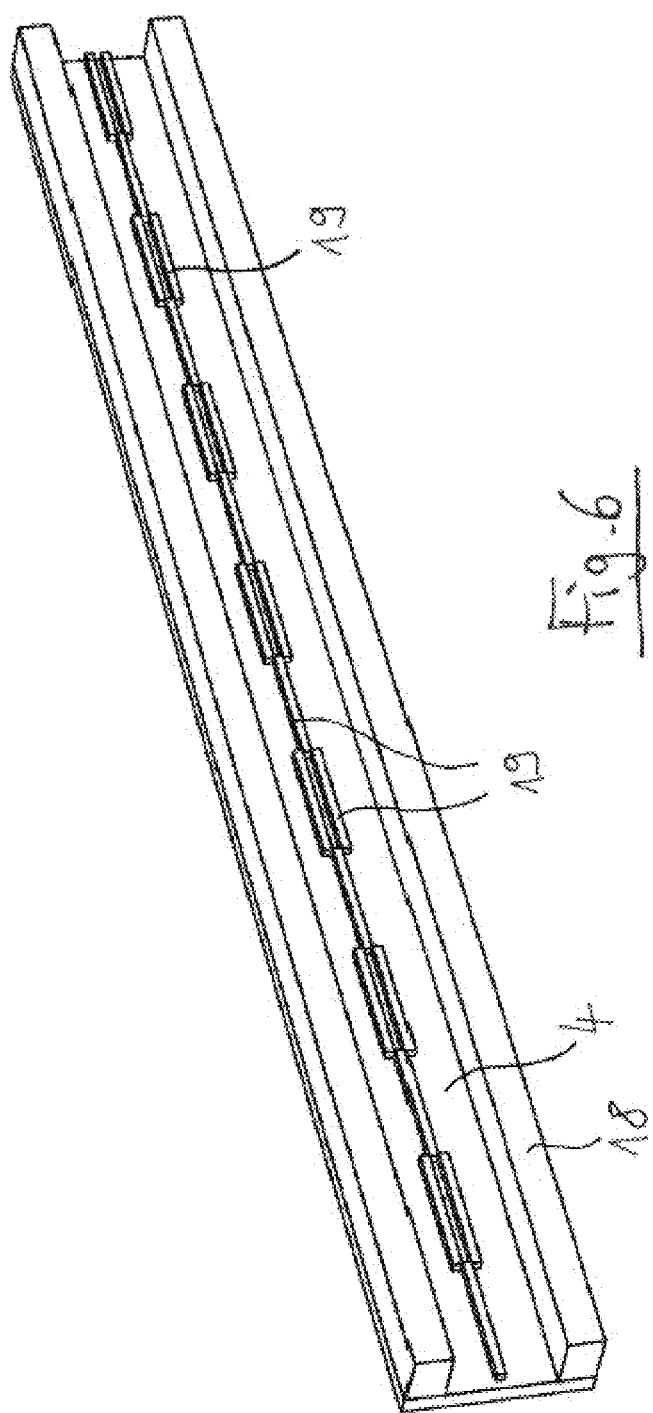

METHOD AND APPARATUS FOR DETERMINING THE 3D COORDINATES OF AN OBJECT

CROSS-REFERENCE TO RELATED APPLICATION

This application claims Convention priority of German patent application 10 2016 014 384.3, filed on Dec. 2, 2016. The entire content of this priority application is incorporated herein by reference.

BACKGROUND OF THE INVENTION

The invention relates to a 3D sensor for an apparatus for determining the 3D coordinates of an object, to an apparatus for determining the 3D coordinates of an object and to a method for determining the 3D coordinates of an object.

DE 10 2009 032 262 A1 discloses a method for determining the 3D coordinates of an object, in which a 3D sensor is used which comprises a projection device and a camera. A stripe pattern is projected onto the object by the projection device. The camera records images of the object. Based on this, the 3D coordinates of the surface of the object can be determined. The object is surrounded by a plurality of reference scenes with coded reference marks. A plurality of recordings are made of the object such that it contains in each case part of the object and part of a reference scene. It is possible in this way to combine individual recordings of the object and register them in a superordinate coordinate system.

DE 10 2011 011 360 A1 discloses an apparatus for determining the 3D coordinates of an object, having a 3D sensor which comprises a projection device and a camera. The object is positioned in a measuring cell, on whose walls fields of reference marks are arranged that are recorded by a reference camera. The apparatus can be used to perform a method for globally registering the object.

DE 10 2014 012 203 A1 discloses an apparatus for determining the 3D coordinates of the surface of an object, having a measurement table with reference marks, a 3D sensor and a tracking system.

In order to obtain a superordinate global registration of the 3D coordinates of an object, the local 3D coordinates that are determined in the individual recordings must be stitched together. This can be done by way of "matching" using methods of photogrammetry or by determining the location and orientation of a 3D sensor using a tracking system. Consequently, the previously known apparatuses for determining the 3D coordinates of an object that permit global registration of the object require reference marks and/or a tracking system, which is associated with a significant outlay.

SUMMARY OF THE INVENTION

Proceeding from this, the invention is based on the object of proposing a simplified method and a simplified apparatus for determining the 3D coordinates of an object.

According to the invention, this object is achieved by means of a 3D sensor having the features of claim 1. The 3D sensor for an apparatus for determining the 3D coordinates of an object comprises at least one camera and at least three plane projectors. The 3D coordinates of the object can be determined by way of the camera. The plane projectors project light planes into the space around the 3D sensor. The location and orientation of the 3D sensor can be determined from the light planes. This allows the global registration of the 3D coordinates of the object that have been determined by the 3D sensor.

The object on which the invention is based is furthermore achieved by way of an apparatus for determining the 3D coordinates of an object, which comprises a 3D sensor in accordance with the invention and a plurality of, preferably at least three, line-scan sensors that are arranged in each case at an angle with respect to one another. At least two line-scan sensors are required to carry out the invention. Preferably, three line-scan sensors are used. The line-scan sensors are preferably at right angles with respect to one another. The line-scan sensors are arranged such that they are fixed with respect to the apparatus, while the 3D sensor is movable in terms of location and orientation. The latter can be guided by hand. However, the 3D sensor can also be connected to an industrial robot that can move and position said sensor by controlling the location and orientation thereof. The line-scan sensors are suitable for generating path-dependent signals that indicate the points of intersection of the light planes with the line-scan sensors. The location and orientation of the 3D sensor can be determined from said points of intersection.

Advantageous refinements are specified in the dependent claims.

The 3D sensor can have a projector for projecting a pattern onto the object. The pattern is preferably a stripe pattern.

The 3D sensor can alternatively or additionally have a scanner. The scanner is preferably in the form of a line scanner. It is advantageous if the scanner is a laser scanner or a laser line scanner.

The sensor can furthermore have a stereo system that comprises at least two stereo cameras, by way of which the 3D coordinates of the object can be determined.

It is advantageous if the 3D sensor has three or six plane projectors.

It is furthermore advantageous if the light planes that are projected by in each case three plane projectors extend perpendicular with respect to one another. The arrangement in this case is such that in each case two light planes extend parallel with respect to and at a distance from one another. It is possible in this way to produce two coordinate systems with a parallel offset.

The one, the plurality of or all of the plane projectors can be in the form of laser plane projectors. Preferably, the laser is a rotating laser. The plane projectors can have rotating mirrors or conical mirrors.

It is advantageous if three or six line-scan sensors are provided.

It is furthermore advantageous if in each case three line-scan sensors extend at right angles with respect to one another. The arrangement in this case is such that in each case two line-scan sensors extend parallel with respect to and at a distance from one another. It is possible in this way to produce two coordinate systems with a parallel offset.

The object on which the invention is based is furthermore achieved by way of a method for determining the 3D coordinates of an object, wherein the method is performed using an apparatus in accordance with the invention, the object is recorded by the at least one camera, the points of intersection of the light planes with the line-scan sensors are determined, and the location and orientation of the 3D sensor are determined therefrom.

It is advantageous if a pattern, in particular a stripe pattern, is projected onto the object and/or if the object is irradiated with light from a scanner, preferably a line scanner and/or laser scanner and/or laser line scanner.

It is advantageous if the 3D sensor is positioned by an industrial robot during the performance of the method.

BRIEF DESCRIPTION OF THE DRAWINGS

An exemplary embodiment of the invention will be explained in detail below with reference to the attached drawing. In the drawing:

FIG. 5 shows part of three line-scan sensors in a perspective illustration, and FIG. 6 shows part of a line-scan sensor in an enlarged perspective illustration.

DETAILED DESCRIPTION OF THE PREFERRED EMBODIMENTS

Figure 1:
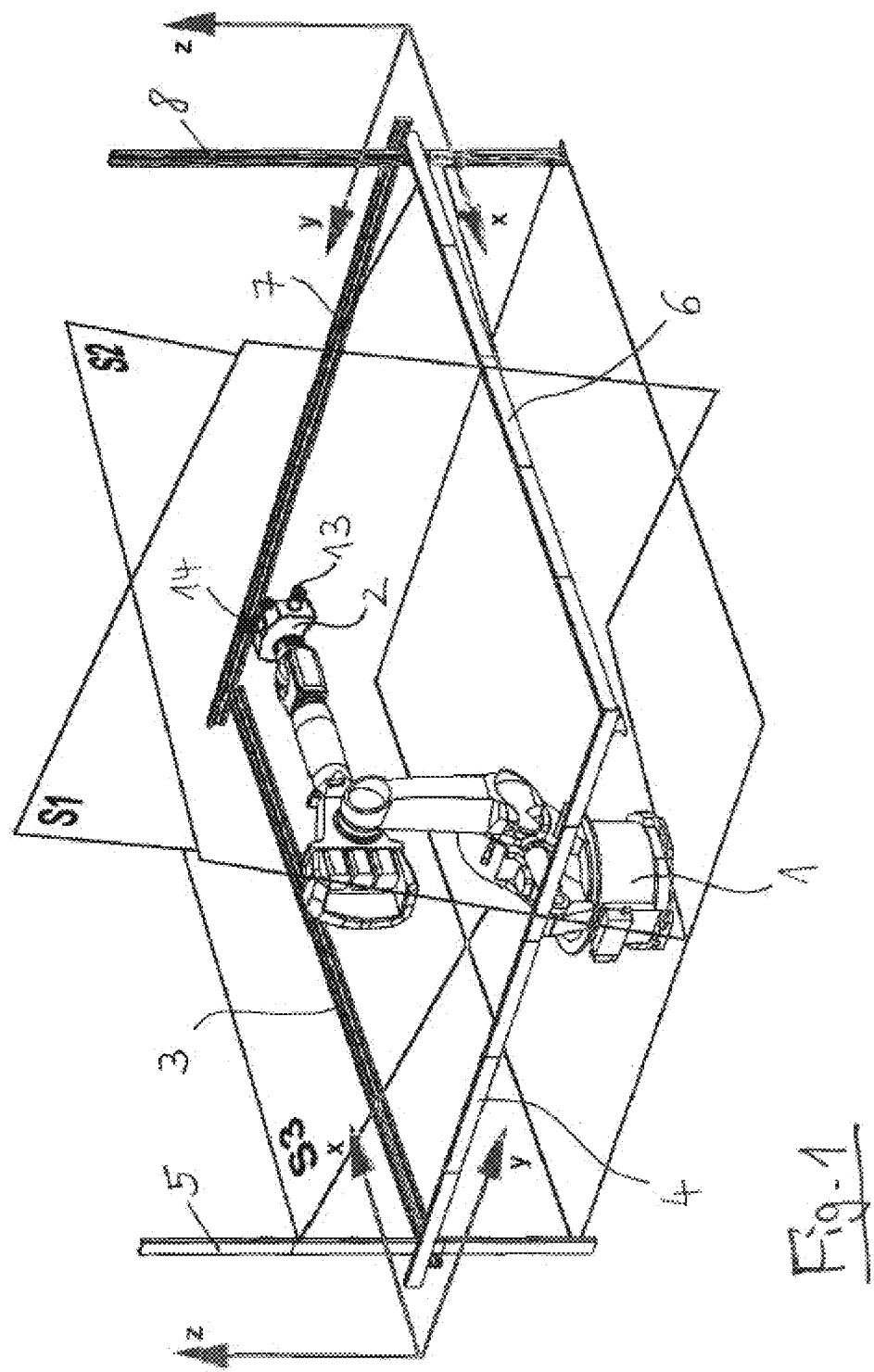
FIG. 1 shows a perspective view of an apparatus according to the invention for determining the 3D coordinates of an object with a 3D sensor, which is attached to an industrial robot, and six line-scan sensors, of which in each case three are arranged such that they are right-angled with respect to one another and of which two in each case are arranged parallel with respect to and at a distance from one another.
Figure 2:
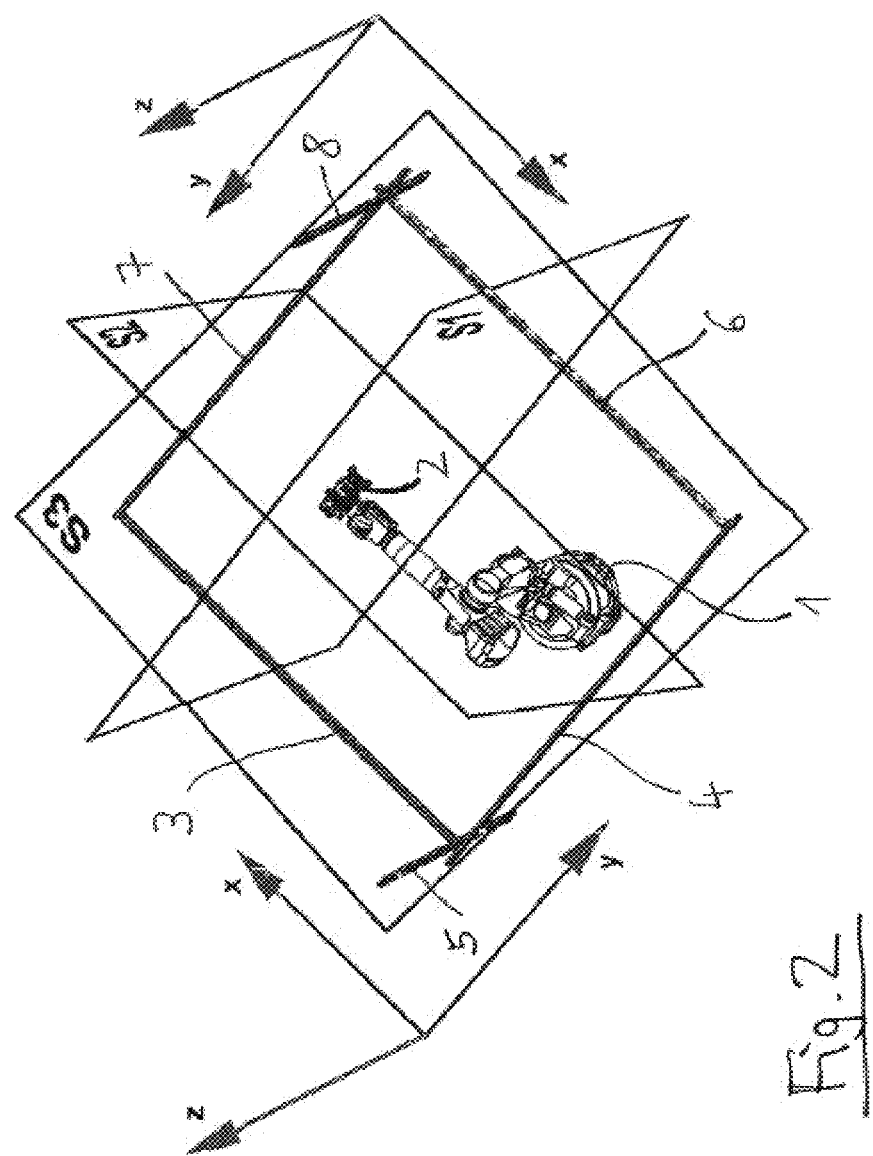
FIG. 2 shows a further perspective illustration of the apparatus of FIG. 1 from a higher perspective.

The apparatus for determining the 3D coordinates of an object, shown in FIGS. 1 and 2, comprises an industrial robot 1, which comprises a plurality of movable arms, a 3D sensor 2, which is attached to the outermost arm of the industrial robot 1 in a manner in which it can be removed, and six line-scan sensors 3, 4, 5, 6, 7, 8, which are arranged such that they are fixed with respect to the apparatus. The line-scan sensors 3, 4, 5 are in each case arranged at right angles with respect to one another. The line-scan sensor 3 forms the x-axis, the line-scan sensor 4 forms the y-axis, and the line-scan sensor 5 forms the z-axis. The line-scan sensors 3 and 4 both extend in the horizontal direction, and the line-scan sensor 5 extends in the vertical direction.

The line-scan sensors 6, 7, 8 are likewise at right angles with respect to one another. The line-scan sensor 6 forms the x-axis. It extends parallel with respect to and at a distance from the line-scan sensor 3 in the horizontal direction at the same height as the line-scan sensor 3. The line-scan sensor 7 forms the y-axis. It extends parallel with respect to and at a distance from the line-scan sensor 4 in the horizontal direction at the same height as the line-scan sensor 4. The line-scan sensor 8 forms the z-axis. It extends in the vertical direction parallel with respect to and at a distance from the line-scan sensor 5.

Figure 3:
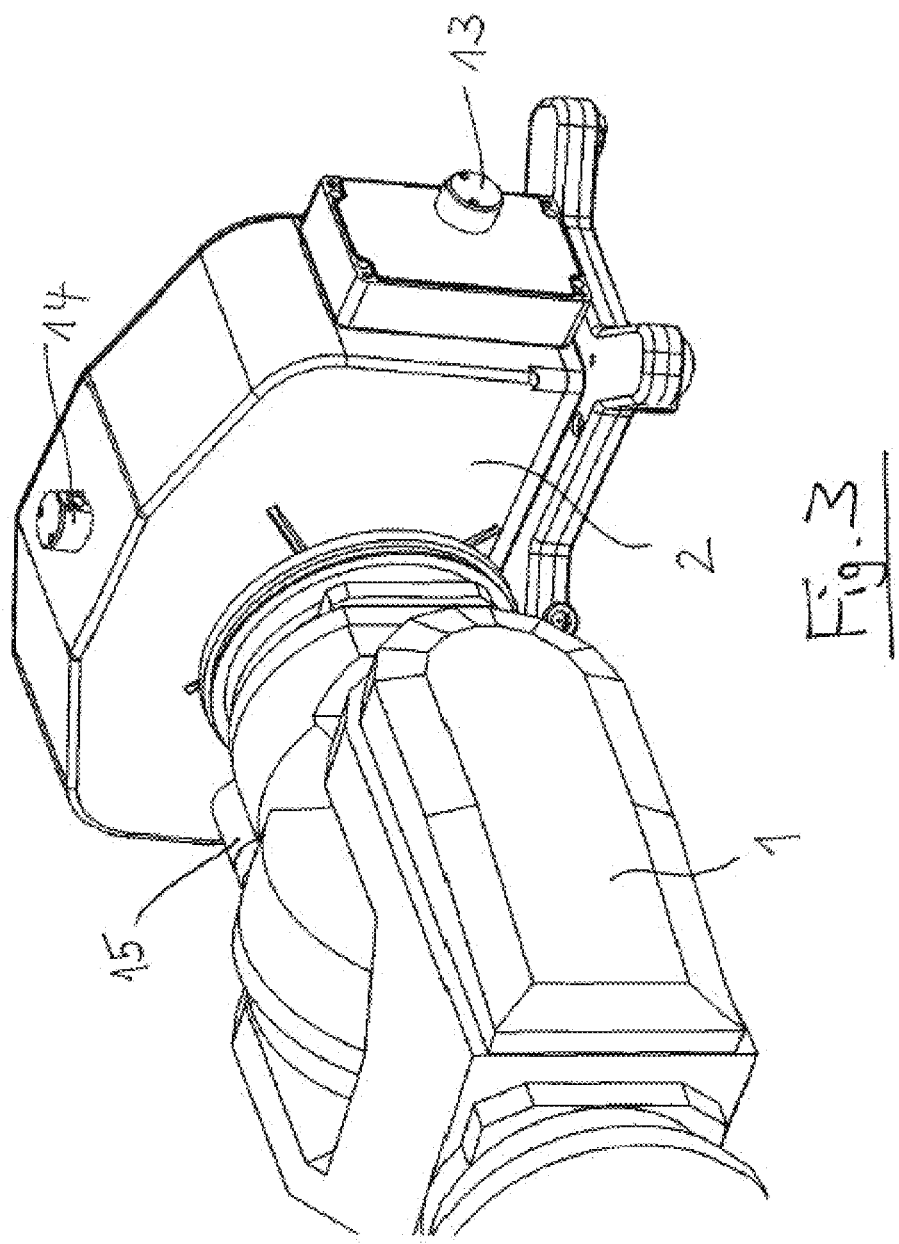
FIG. 3 shows the 3D sensor in a perspective rear view at an angle from above.
Figure 4:
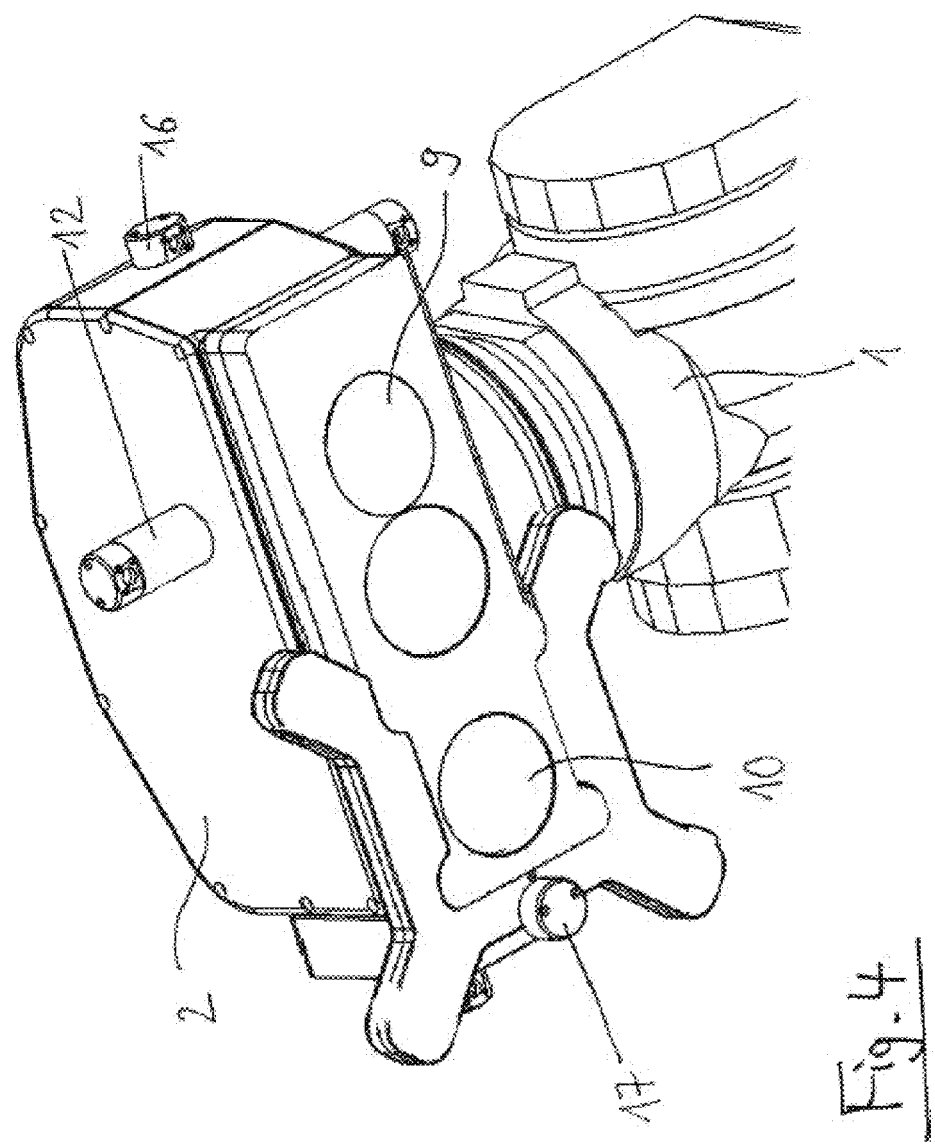
FIG. 4 shows the 3D sensor of FIG. 3 in a perspective front view at an angle from below.

As can be seen in particular from FIGS. 3 and 4, the 3D sensor 2 has a projector 9 for projecting a pattern, specifically a stripe pattern, onto an object to be measured (not shown in the drawing) and a camera 10 for recording the object. Attached to the 3D sensor 2 are furthermore six plane projectors 12, 13, 14, 15, 16, 17. The plane projector 12 produces the light plane S1 which, in the state of the 3D sensor 2 in accordance with FIGS. 1 and 2, extends substantially parallel with respect to the vertical y-z-plane. The plane projector 15 produces a light plane which extends parallel with respect to and at a distance from the light plane S1. The plane projector 13 produces the light plane S2 which, in the state of the 3D sensor 2 in accordance with FIGS. 1 and 2, extends substantially parallel with respect to the vertical x-z-plane. The plane projector 16 produces a light plane which extends parallel with respect to and at a distance from the light plane S2. The plane projector 14 produces a light plane S3 which, in the state of the 3D sensor 2 in accordance with FIGS. 1 and 2, extends substantially parallel with respect to the horizontal x-y-plane. The plane projector 17 produces a light plane which extends parallel with respect to and at a distance from the light plane S3.

The line-scan sensors 3, 4, 5 shown enlarged in FIGS. 5 and 6 each comprise a fastening element 18 and light-sensitive sensor elements 19, which are regularly arranged in a straight line. The sensor elements 19 can be in the form of CCD elements or CMOS elements. The fastening elements 18 are in the form of bars having a U-shaped profile. The sensor elements 19 are arranged on the insides of the base of the fastening elements 18. They are individually readable.

During operation, the 3D sensor 2 is positioned at an appropriate site by the robot 1. The object is irradiated with light, specifically with a stripe pattern, from the projection device 9. The object is recorded by the camera 10. The recordings are processed by an appropriate evaluation device. The evaluation device can be a computer, in particular a PC. The evaluation device can have a memory device. It processes the images recorded by the camera 10 into 3D coordinates. The 3D coordinates can be displayed and/or stored and/or processed further.

The plane projectors 12-17 and the line-scan sensors 3-8 serve for the determination of the location and orientation of the 3D sensor 2. The light planes S1, S2, S3, which are produced by the plane projectors 12, 13, 14, intersect the line-scan sensors 3, 4, 5 at specific points which are ascertained by the sensor elements 19 of the respective line-scan sensor 3, 4, 5. At the same time, the light planes S1, S2, S3 also intersect the line-scan sensors 6, 7, 8 at specific points which are indicated by the respective sensor elements 19. In the ideal case, each light plane S1, S2, S3 produces three points of intersection on the line-scan sensors 3, 4, 5, i.e. a total of nine points of intersection. In the ideal case, the light planes S1, S3, S3 similarly produce in each case three points of intersection on the further line-scan sensors 6, 7, 8, i.e. a total of a further nine points of intersection. The ideal number of a total of eighteen points of intersection can be reduced by shadowing and other effects.

The further plane projectors 15, 16, 17 produce further points of intersection with the line-scan sensors 3, 4, 5 and 6, 7, 8. This produces a further eighteen points of intersection in the ideal case. The actual number of the points of intersection can be lower due to shadowing and other effects.

The total number of points of intersection produced in the ideal case is thirty-six. In any case, a sufficient number of actual points of intersection remain that the three location coordinates and the three orientation coordinates of the 3D sensor 2 can be calculated and ascertained therefrom. In this way, absolute registration of the 3D coordinates of the object is possible.

With the invention a superordinate system for globally registering the 3D coordinates of an object is provided that can quickly and reliably ascertain the position and orientation of a 3D sensor with the necessary accuracy in the entire measurement region. The measurement region is defined by the arrangement of the line-scan sensors. The system can be employed in an industrial environment. It is capable of effecting the global registration of the 3D coordinates with the necessary accuracy. In particular, an accuracy of +/−15 µm with a working distance of 500 mm to 900 mm can be attained.

In order to uniquely describe the position and direction, or orientation, of a 3D sensor in space, it is necessary to know the position of the 3D sensor in space in relation to a coordinate system. The coordinate system is preferably a Cartesian coordinate system. It is advantageous if two coordinate systems with a parallel offset are established for redundancy. Furthermore, knowledge of the angular offset of the coordinate axes of the 3D sensor with respect to the corresponding axes of the coordinate system is necessary. By determining the location of three planes that are connected to the sensor and are produced by the plane projectors, it is possible to ascertain the location and orientation of the 3D sensor. Preferably, more than three planes are used, with the result that a greater accuracy in the position and location ascertainment can be attained due to the utilization of the redundancy. It is furthermore possible hereby to counteract the shadowing problem due to the handling axes.

The invention claimed is:

1. An apparatus for determining 3D coordinates of an object, the apparatus comprising:
    a 3D sensor comprising:
        at least one camera and
        at least three plane projectors and
    a plurality of line-scan sensors that are arranged at an angle with respect to one another.

2. The apparatus of claim 1, wherein the 3D sensor further includes a projector that is configured to project a pattern onto the object.

3. The apparatus of claim 1, wherein the 3D sensor includes a scanner.

4. The apparatus of claim 1, wherein the 3D sensor comprises three plane projectors.

5. The apparatus of claim 1, wherein:
    the at least three plane projectors extend perpendicularly with respect to one another and
    each of the at least three plane projectors is configured to project a light plane.

6. The apparatus of claim 1, wherein at least one of the at least three plane projectors comprises a laser plane projector.

7. The apparatus of claim 1, wherein the plurality of line-scan sensors comprises three line-scan sensors.

8. The apparatus of claim 7, wherein three of the line-scan sensors extend at right angles with respect to one another.

9. The apparatus of claim 1, further including an industrial robot configured to position the 3D sensor.

10. The apparatus of claim 1, wherein the 3D sensor comprises six plane projectors.

11. The apparatus of claim 1, wherein the plurality of line-scan sensors comprises six line-scan sensors.

12. An apparatus for determining 3D coordinates of an object, the apparatus comprising:
    a 3D sensor comprising:
        a camera and
        a plurality of plane projectors that extend perpendicularly with respect to one another, wherein each of the plurality of plane projectors is configured to project a light plane and,
    a plurality of line-scan sensors that are arranged at an angle with respect to one another.

13. A method for determining 3D coordinates of an object using an apparatus including a 3D sensor and a plurality of line-scan sensors that are arranged at an angle with respect to one another, wherein the 3D sensor includes at least one camera and at least three plane projectors that project light planes, the method comprising:
    recording the object using the at least one camera,
    determining points of intersection of the light planes using the line-scan sensors, and
    determining, from the points of intersection, a location and an orientation of the 3D sensor.

14. The method of claim 13, further comprising positioning, by an industrial robot, the 3D sensor.

* * * * *